United States Patent
Fiore et al.

(10) Patent No.: US 10,732,035 B2
(45) Date of Patent: Aug. 4, 2020

(54) INTEGRATED SPECTROMETER AND OPTOMECHANICAL SENSOR

(71) Applicant: Technische Universiteit Eindhoven, Eindhoven (NL)

(72) Inventors: Andrea Fiore, Nuenen (NL); Robertus Willebrordus van der Heijden, Waalre (NL); Leonardo Midolo, Copenhagen (DK); Žarko Zobenica, Eindhoven (NL); Tianran Liu, Eindhoven (NL)

(73) Assignee: Technische Universiteit Eindhoven, Eindhoven (NL)

( * ) Notice: Subject to any disclaimer, the term of this patent is extended or adjusted under 35 U.S.C. 154(b) by 197 days.

(21) Appl. No.: 16/068,445

(22) PCT Filed: Jan. 6, 2017

(86) PCT No.: PCT/EP2017/050262
§ 371 (c)(1),
(2) Date: Jul. 6, 2018

(87) PCT Pub. No.: WO2017/118728
PCT Pub. Date: Jul. 13, 2017

(65) Prior Publication Data
US 2019/0072428 A1 Mar. 7, 2019

Related U.S. Application Data

(60) Provisional application No. 62/276,426, filed on Jan. 8, 2016.

(51) Int. Cl.
*G01J 3/42* (2006.01)
*G01J 3/02* (2006.01)
(Continued)

(52) U.S. Cl.
CPC .......... *G01J 3/0256* (2013.01); *G01J 3/0205* (2013.01); *G01J 3/0237* (2013.01); *G01J 3/0259* (2013.01);
(Continued)

(58) Field of Classification Search
CPC ...... G01J 3/0205; G01J 3/0237; G01J 3/0256; G01J 3/0259; G01J 3/26; G01J 3/42
See application file for complete search history.

(56) References Cited

U.S. PATENT DOCUMENTS

| 6,380,531 B1 * | 4/2002 | Sugihwo | B82Y 20/00 250/214.1 |
| 6,546,029 B2 * | 4/2003 | Sirbu | B82Y 20/00 372/20 |

(Continued)

*Primary Examiner* — Thomas R Artman
(74) *Attorney, Agent, or Firm* — Lumen Patent Firm (57) ABSTRACT

A double membrane microspectrometer is provided that includes a first membrane having a first and second doped semiconductor layers, and a first intrinsic layer is disposed between the first and second layers, where the first intrinsic layer includes an optically absorbing material, a first pattern of through holes are disposed perpendicular through the first membrane having lateral support arms, a second membrane having a third doped layer and a fourth layer is an intrinsic layer or a doped layer, where the second membrane includes a second pattern of through holes, where the first membrane is separated from the second membrane by an insulating bridge layer and is supported above the second membrane by lateral support arms, where an absorption spectrum of the absorbing material is dependent on the separation distance of the membranes, electrodes are disposed on the first layer, the second layer, and the third layer operate the separation.

22 Claims, 9 Drawing Sheets

(51) Int. Cl.
*G01J 3/26* (2006.01)
*G01J 3/12* (2006.01)

(52) U.S. Cl.
CPC . *G01J 3/26* (2013.01); *G01J 3/42* (2013.01); *G01J 2003/1213* (2013.01)

(56) References Cited

U.S. PATENT DOCUMENTS

| | | | | |
|---|---|---|---|---|
| 7,307,719 | B2* | 12/2007 | Wang | G01N 21/658 356/301 |
| 7,483,197 | B2* | 1/2009 | Miles | G01L 5/0047 359/290 |
| 7,968,846 | B2* | 6/2011 | Talghader | G01J 5/58 250/338.1 |
| 2006/0055920 | A1* | 3/2006 | Wang | G01N 21/658 356/301 |
| 2006/0250337 | A1* | 11/2006 | Miles | G01L 5/0047 345/85 |
| 2008/0035846 | A1* | 2/2008 | Talghader | G01J 5/08 250/338.1 |
| 2019/0072428 | A1* | 3/2019 | Fiore | G01J 3/0237 |

* cited by examiner

INTEGRATED SPECTROMETER AND OPTOMECHANICAL SENSOR

CROSS-REFERENCE TO RELATED APPLICATIONS

This application is a 371 of PCT application PCT/EP2017/050262 filed Jan. 6, 2017. PCT/EP2017/050262 claims the benefit of U.S. Provisional application 62/276,426 filed Jan. 8, 2016.

FIELD OF THE INVENTION

The present invention relates generally to optical sensors. More particularly, the invention relates to an integrated sensing device, few tens of microns in size, capable of measuring the spectrum of incoming tight.

BACKGROUND OF THE INVENTION

In consumer and industrial applications there is an increasing need for ubiquitous sensors. For many of these applications optical sensing provides the best resolution and selectivity, but optical sensors are usually based on discrete optical elements and therefore costly.

Many sensing applications require measuring the light spectrum. This usually requires a dispersive element (eg a grating) and a detector or detector array, which are combined in a bulky (1-100 cm) and expensive instrument. This is unacceptable for applications that require compact and cheap solutions—e.g. gas sensing for agriculture, monitoring of industrial processes, medical diagnostics. Moreover, there is a trade-off between resolution and size: Making the spectrometer smaller affects its resolution. Attempts at integrating the grating element on an optical chip typically result in a poor resolution (several nm). Additionally, producing large arrays of spectrometers for high-resolution hyperspectral imaging is presently not possible. A second application area is the measurement of mechanical motion at the picometer scale, and correspondingly force and acceleration. While this can be done with optics (e.g. using interferometric methods), it usually requires complex and bulky systems.

Integrated spectrometer implementations are mostly based on arrays of filter elements, which limits the resolution, and rely on external detectors, resulting in a much increased packaging complexity and cost. In principle, the combination of a tuneable optical cavity and a photodetector can lead to an extremely compact spectrometer, particularly if the detector is integrated inside the cavity. However, for many applications high resolution is needed under a wide range of incident angles and over a wide spectral range. This can only be achieved by a wavelength-scale cavity combining low optical loss, wide free spectral range (FSR) and large tuneability. So far, tuneable microcavity detectors have achieved limited resolution and spectral range.

What is needed is an optical sensor, having outstanding resolution and bandwidth, which is fully integrated and mass-manufacturable.

SUMMARY OF THE INVENTION

To address the needs in the art, a double membrane microspectrometer is provided that includes a first membrane having a first doped semiconductor layer, a first intrinsic semiconductor layer, and a second doped semiconductor layer, where the first doped semiconductor layer is opposite the second doped semiconductor layer, where the first intrinsic semiconductor layer is disposed between the first doped semiconductor layer and the second doped semiconductor layer, where the first intrinsic semiconductor layer includes an optically absorbing material disposed therein, where the first membrane includes a first pattern f through holes disposed perpendicular to the first membrane semiconductor layers, where the first membrane includes lateral support arms disposed to support the first membrane, a second membrane having a third doped semiconductor layer and a fourth semiconductor layer, where the third doped semiconductor layer is opposite the fourth semiconductor layer, where the fourth semiconductor layer includes an intrinsic semiconductor layer or a doped semiconductor layer, where the second membrane includes a second pattern of through holes disposed perpendicular to the second membrane semiconductor layers, where the first membrane is separated from the second membrane by a first insulating bridge layer disposed proximal to the ends of the lateral support arms, where the first optical membrane is supported above the second membrane by the lateral support arms, where an absorption spectrum of the structure is dependent on a separation distance of the first membrane from the second membrane, a first electrode disposed on the first semiconductor layer, a second electrode disposed on the second semiconductor layer, and a third electrode disposed on the third semiconductor layer, where an illuminating source directed across the first pattern of holes is absorbed in the optical absorbing material in the first intrinsic semiconductor layer, where a photocurrent is output between the first electrode and the second electrode for detection, where a voltage applied across the second electrode and the third electrode is disposed to move the first membrane to alter a photocurrent between the first electrode and the second electrode, where the photocurrent alteration corresponds to the optical spectrum of the illuminating source.

According to one aspect of the invention, the first electrode is connected to an amplifier and the second electrode is connected to a ground to form an integrated photocurrent detector, where the integrated photocurrent detector detects the photocurrent across the first intrinsic semiconductor layer according to the illuminating source directed on the pattern of holes. In one aspect, the combination of first and second pattern defines the resonance, where the first and second patterns of holes are identical and are configured to produce a resonance in a photocurrent, where the applied voltage alters a spectral position of the resonance, where a photocurrent dependence on the applied voltage outputs a measurement of a spectrum of the illuminating source. In one aspect, the applied voltage includes a frequency modulated applied voltage, where the photocurrent from the integrated photocurrent detector is output at the frequency.

In a further aspect of the invention the first pattern of holes in the first membrane and the second pattern of holes in the second membrane are configured to provide a photocurrent spectrum changing with wavelength on the scale of a small fraction of a wavelength, where the applied voltage between the second electrode and the third electrode changes the photocurrent spectrum by moving the membrane on the scale of at least a fraction of a nanometer, where a sequence of measureable photocurrents for different applied voltages is output for reconstructing a spectrum of the illuminating source according to a numerical procedure operated by an appropriately programmed computer. Here, the numerical procedure includes an optimization method of finding the reconstructed spectrum that fits the sequence of measureable photocurrents with least error. Further, the first hole-pattern and the second hole-pattern and the reconstructed spectrum are arranged according to an expected input spectrum according to compressive sensing techniques. In one aspect the compressive sensing techniques include a numerical procedure that reconstructs the expected input spectrum, where the reconstructed input spectrum includes a size that is larger than a size of the sequence of photocurrents.

In another aspect of the invention, at least one absorbing region is patterned within a region of the first membrane or the second membrane or outside a region of the first membrane and the second membrane, where measureable photocurrents of the at least one absorbing region are output according to different applied voltages, where a spectrum of the illuminating source is reconstructed according to a numerical procedure operated by an appropriately programmed computer. Here, the first hole-pattern and the reconstructed spectrum are arranged according to an expected input spectrum according to compressive sensing techniques.

According to one aspect of the invention, the first electrode is connected to an amplifier and the second electrode is connected to a ground to form an integrated displacement detector, where the integrated displacement detector detects a displacement between the first membrane and the second membrane, where the applied voltage between the second electrode and the third electrode actuates a position of the first membrane. In one aspect, a combination of an actuator and a sensor is configured to output feedback stabilization of the position of the first membrane. In another aspect, a combination of an actuator and a sensor is configured to map a spatial profile of a surface under test.

In another aspect of the invention, the first semiconductor layer includes a p-type semiconductor layer and the second semiconductor layer includes an n-type semiconductor layer, or the first semiconductor layer includes an n-type semiconductor layer and the second semiconductor layer includes a p-type semiconductor layer.

According to a further aspect of the invention, the third semiconductor layer includes a p-type semiconductor layer and the fourth semiconductor layer includes an n-type semiconductor layer, or the third semiconductor layer includes an n-type semiconductor layer and the fourth semiconductor layer includes a p-type semiconductor layer, or the fourth semiconductor layer includes an intrinsic semiconductor layer.

In yet another aspect of the invention a lower part of the first membrane and an upper part of the second membrane are doped to form p-i-n diode.

According to a further aspect of the invention, the optical absorbing material includes quantum wells, quantum dots or bulk material.

In a further aspect of the invention, both membranes include the same periodic pattern of holes, forming a photonic crystal, with a defect, forming a cavity. In one aspect, the cavity is a modified L3 or H0 photonic crystal cavity.

In another aspect of the invention, the first membrane and the second membrane include an aperiodic pattern of through holes, where the first pattern of through holes is the same as second pattern of through holes or the first pattern of through holes is different from the second pattern of through holes In another aspect of the invention, the first membrane, the second membrane and the illuminating source are integrated on a chip, where the illuminating source can include a laser or a light-emitting-diode.

In a further aspect of the invention, an array of the double membrane microspectrometers are provided, where the array of double membrane microspectrometers are disposed in a linear or rectangular pattern, where the hole patterns in the double membranes are the same or different, where the array of double membrane microspectrometers are actuated separately or together, where an image is projected on the array of double membranes through an optical system, where each microspectrometer measures a light spectrum at a given position, where a set of all the light spectra forms a hyperspectral image.

DETAILED DESCRIPTION

Nano-optomechanical structures, such as photonic crystal cavities and micro-ring resonators, combine very high spectral resolution and large optomechanical coupling, resulting in exquisite sensitivity to nanoscale mechanical motion. This interaction between optical and mechanical degrees of freedom can be used to transduce pm-scale mechanical displacements into wavelength shifts and vice versa. This opens the way to a new generation of ultracompact optical sensors, if the required control and read-out can be integrated with the sensing part.

Presented herein is a nano-opto-electromechanical system (NOEMS) where the three functionalities of transduction, actuation and detection are fully integrated, resulting in a high-resolution spectrometer with a µm-scale footprint. This unique combination of functionalities is used to demonstrate a new method of resonance modulation spectroscopy, which provides sub-picometer wavelength resolution. Further presented is its application as displacement-to-photocurrent transducer, leading to the demonstration of optomechanical displacement sensing with integrated photocurrent read-out.

The optical sensors of the current invention offer outstanding resolution and bandwidth, and yet are fully integrated and mass-manufacturable. In one aspect, the current invention is directed to the measurement of optical spectra, for example for gas sensing and Raman spectroscopy or for the monitoring of laser lines (wavemeters) or to the detection of motion.

Figure 6:
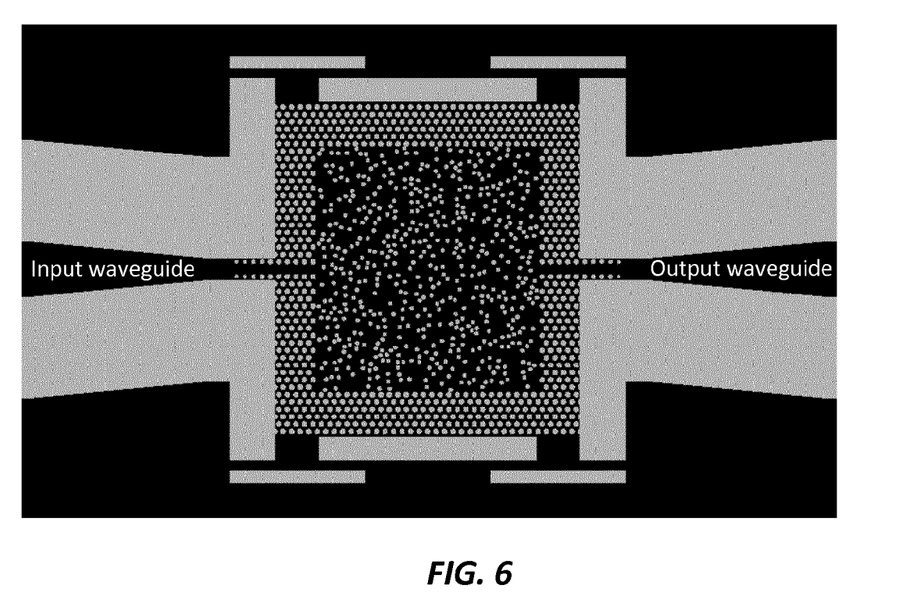
FIG. 6 shows a mask design of the active area of a microspectrometer, showing the aperiodic pattern of holes patterned into the double-membrane structure, according to one embodiment of the invention.

The invention includes an integrated sensing device, few tens of microns in size, capable of measuring the spectrum of incoming light. It is based on electromechanically-tunable photonic structures based on periodic or aperiodic hole-patterns in two moveable membranes. Light is coupled to the sensor from the top or the bottom or through one input waveguide, see for example FIG. 6.

Figure 1:
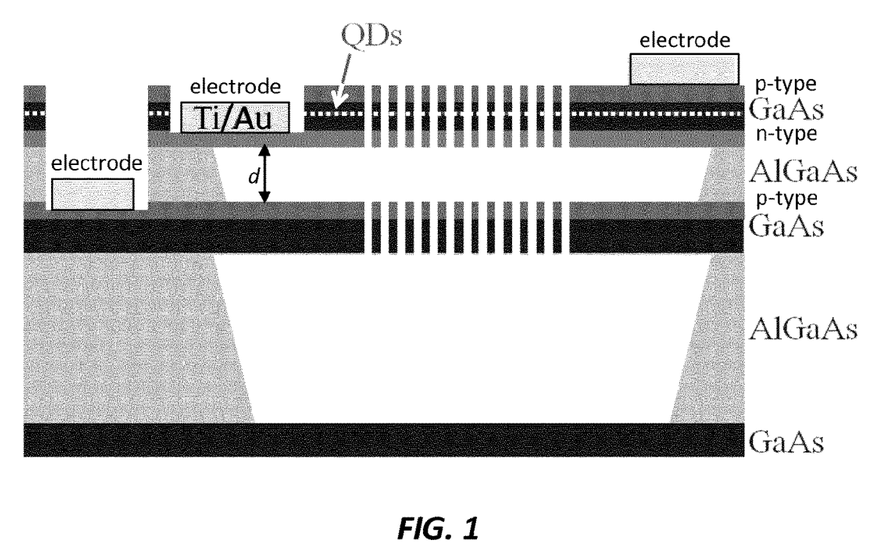
FIG. 1 shows a sketch of a microspectrometer showing the photonic crystals and the contacts for the actuation, according to one embodiment of the invention.

FIG. 1 shows a drawing of a microspectrometer with a photonic crystal cavity, contacts middle and bottom) for the actuation, and contacts for the photodiode (middle and top), according to one embodiment of the invention.

Figure 2:
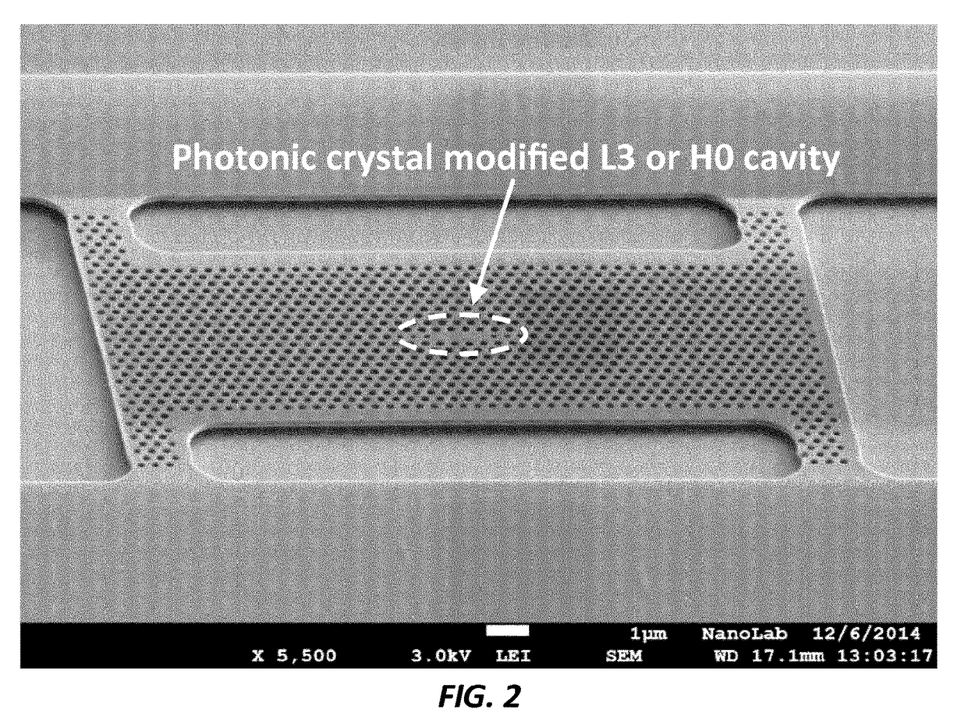
FIG. 2 shows a scanning electron microscope image of the active area of a fabricated microspectrometer, showing the photonic crystal cavity patterned into the double-membrane structure, according to one embodiment of the invention.

FIG. 2 shows a scanning electron microscope image of the active area of a fabricated microspectrometer, having a periodic hole-pattern (photonic crystal) with a defect at the center (cavity) patterned into the double-membrane structure, according to one embodiment of the invention.

Figure 3A:
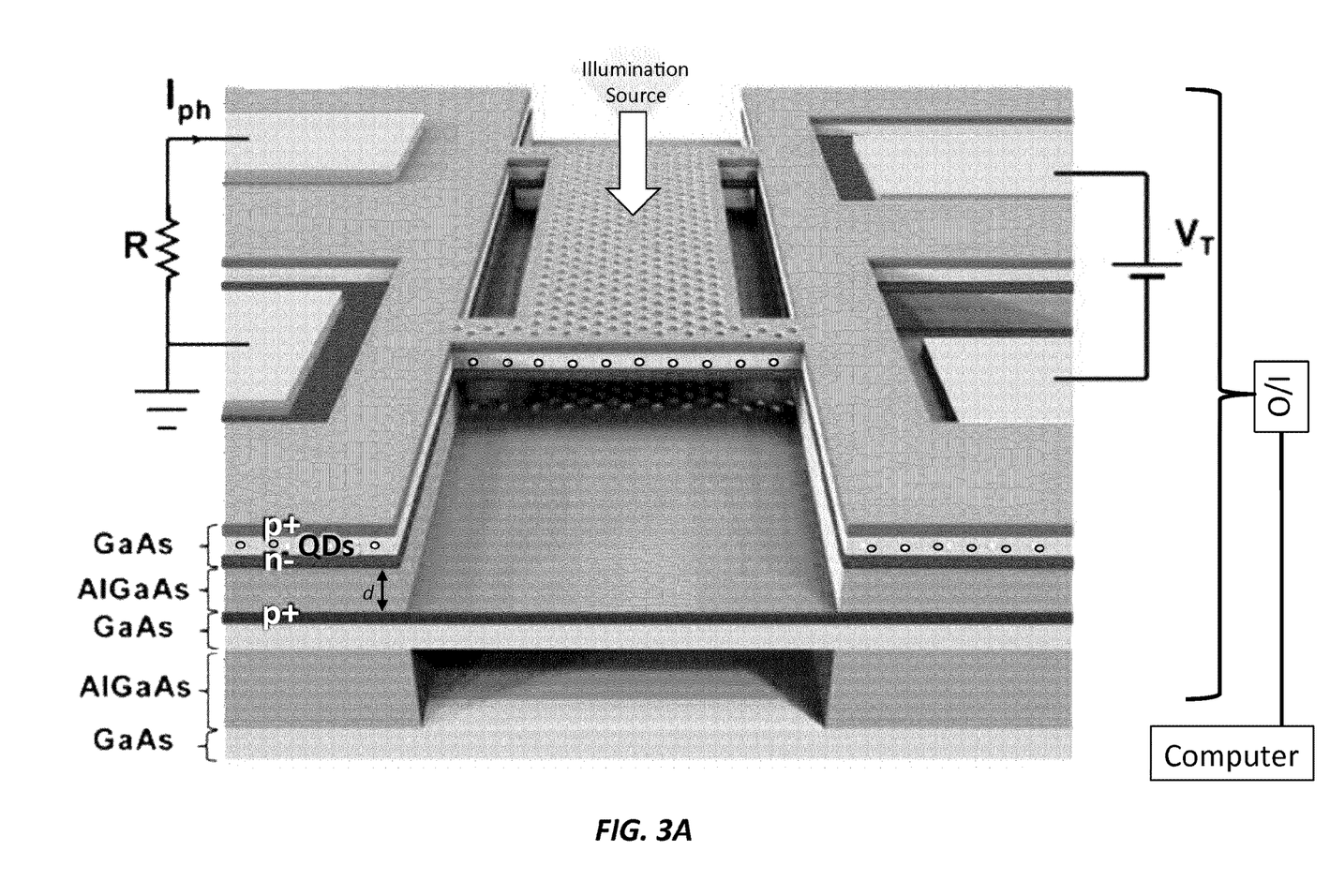
FIGS. 3A-3D show an overview of a microspectrometer sensor, according to one embodiment of the invention.

FIGS. 3A-3D show an overview of a microspectrometer sensor, according to one embodiment of the invention, where FIG. 3A shows a sketch of the device with contacts inside mesa structures, and visible cross-section with p-type and n-type doped layers and optical absorbers, such as quantum dots (QDs), embedded in the middle of the top membrane, where sensor actuation is enabled by applying a reverse bias voltage (VT) to the tuning diode (on the right side), and sensor readout is done by measuring the photocurrent of the photodiode (left side). According to one aspect of the invention, the first electrode is connected to an amplifier and the second electrode is connected to a around to form an integrated photocurrent detector, where the integrated photocurrent detector detects the photocurrent across the first intrinsic semiconductor layer according to the illuminating source directed on the pattern of holes. In one aspect, the same pattern of holes are in both membranes, forming a photonic crystal cavity, and is configured to produce a resonance in a photocurrent, where the applied voltage alters a spectral position of the resonance, where a photocurrent dependence on the applied voltage outputs a measurement of a spectrum of the illuminating source. In a further aspect, the applied voltage includes a frequency modulated applied voltage, where the photocurrent from the integrated photocurrent detector is output at the frequency.

Figure 3B:
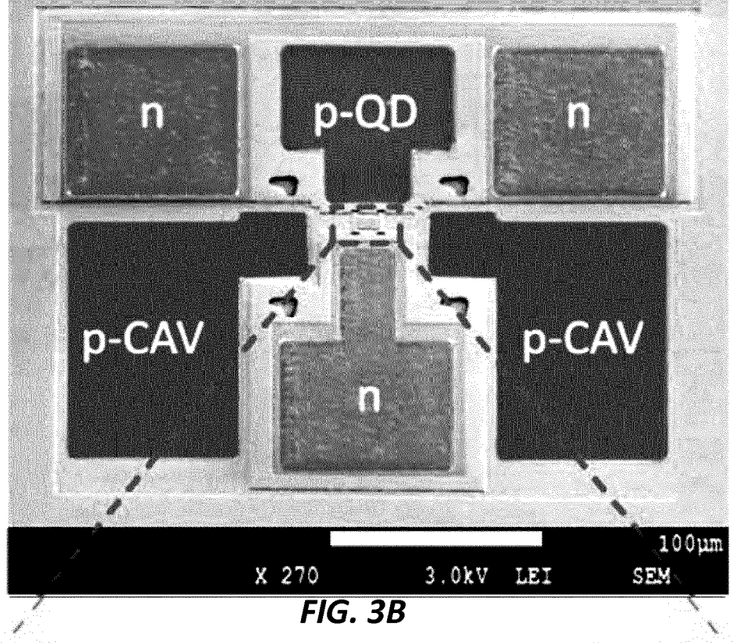
Figure 3C:
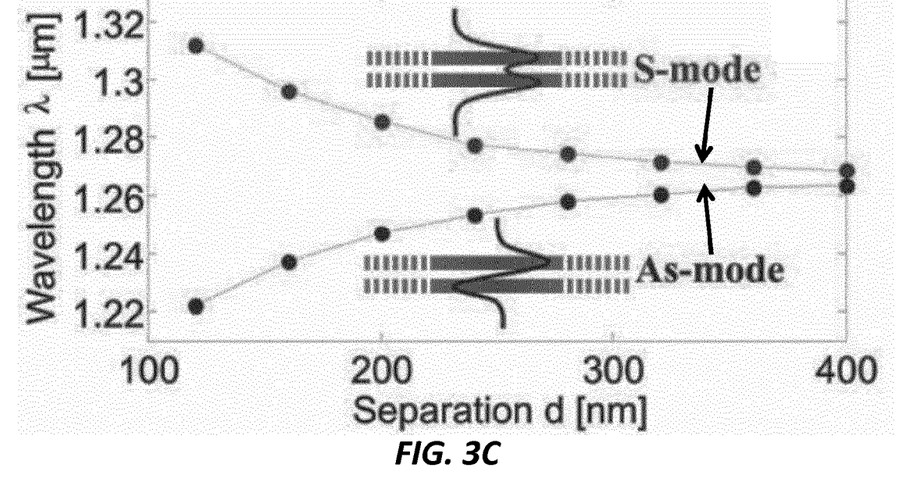
Figure 3D:
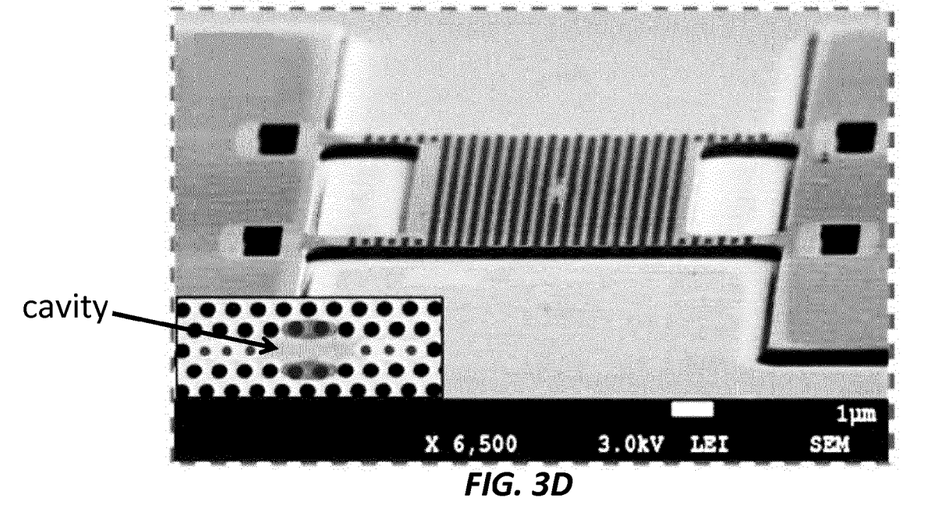

FIG. 3B and FIG. 3D show SEM images of an exemplary device with contacts for the two diodes, where FIG. 3D shows a zoom-in SEM image showing the active part of the sensor: a four-arm bridge of dimensions 16 µm×12 µm containing a photonic crystal membrane suspended over the second, fixed photonic crystal membrane. The inset is an SEM image of the patterned L3 cavity design modified for high Q-factor and large free spectral range in a double membrane structure by displacing horizontally outwards and reducing the radius of six holes horizontally and displacing four holes vertically. FIG. 3C shows simulated optical mode wavelength dependence of membrane separation for two modes that are symmetric (S) or asymmetric (As) with respect to the out-of-plane direction. According to one embodiment, photon detectors are integrated within a chip as shown in FIG. 3B. In other embodiments, the photon detectors are placed outside the moveable structure or externally, in which case waveguides collect light out of the membranes (see FIG. 6).

In one embodiment, a new method of scattering modulation spectroscopy is provided that is based on the mechanical modulation of the resonance and synchronised read-out, to improve the spectral resolution and the bandwidth in spectral measurements.

In a further embodiment, the invention provides "microspectrometers" that are tens of μm in size, with spectral resolution in sub nm range, and bandwidth of more than 100 nm if multiple output waveguide or multiple tuning regions are applied.

In another aspect of the invention, the first semiconductor layer includes a p-type semiconductor layer and the second semiconductor layer includes an n-type semiconductor layer, or the first semiconductor layer includes an n-type semiconductor layer and the second semiconductor layer includes a p-type semiconductor layer.

According to a further aspect of the invention, the third semiconductor layer includes a p-type semiconductor layer and the fourth semiconductor layer includes an n-type semiconductor layer, or the third semiconductor layer includes an n-type semiconductor layer and the fourth semiconductor layer includes a p-type semiconductor layer, or the fourth semiconductor layer includes an intrinsic semiconductor layer.

In yet another aspect of the invention a lower part of the first membrane and an upper part of the second membrane are doped to form p-i-n diode.

According to a further aspect of the invention, the optical absorbing material includes quantum wells, quantum dots or bulk material. In one aspect, the optically absorbing material has a broad (ideally flat) absorption spectrum, while absorption of the combined structure, the double membrane and the optically absorbing material, is determined by the hole pattern and on the separation distance The current invention integrates the actuation, sensing and read-out within a footprint of only 15×15 μm² and provides high resolution even under a large numerical aperture (NA) illumination. Sketches of some embodiments of the invention are shown in FIG. 1 and FIG. 3A that are based on an electromechanically tuneable, double-membrane photonic crystal (PhC), and a low-absorption active material (quantum dots). In one embodiment, two identical cavities in the two parallel membranes are evanescently coupled so that each original cavity mode splits into a symmetric (S) and an antisymmetric (AS) mode. The resonant wavelengths strongly depend on the separation d between the membranes; as shown in the simulated tuning curves of FIG. 3C. In the range of d~200 nm the optical angular frequency shift per displacement $G\omega = d\omega/dx$ is in the range of $2\pi°$-37 GHz/nm (dλ/dx=0.2 nm/nm25). In one example, the lower part of the upper membrane and the upper part of the lower membrane are doped in order to form a p-i-n diode, where it is understood that the dopant types can be reversed between the two membranes. The distance between the membranes can be controlled by using electrostatic actuation provided by a reverse bias voltage VT across the p-i-n diode. Compared to in-plane capacitive tuning, this vertical-actuation structure offers larger capacitance, resulting in more efficient actuation, and smaller footprint. Moreover, it enables the actuation and sensing of out-of-plane motion, which is relevant for most nanometrology applications, such as atomic force microscopy. The upper membrane is configured as another p-i-n diode, the n-layer being common to both diodes, see FIG. 3A. In one example, a layer of InAs QDs, absorbing in the resonant wavelength range, is grown at the center of the upper membrane. Where the optical absorbers can be QD's, quantum wells or any bulk optical absorbing material. The modal absorption, and thereby the detector efficiency and the cavity loss, can be controlled by controlling the density of the QDs. In one example embodiment, the dot density is chosen so that the absorption contribution to the cavity loss does not limit the Q factor. In this example, it is estimated that the modal absorption is $\alpha_{mod}$=1.4 cm$^{-1}$, corresponding to an absorption-limited quality factor (Qabs) of $1.2 \times 10^5$. In these examples, the PhC cavities are modified L3 or H0 cavities where the position and size of the holes close to the cavity center have been optimized to achieve at the same time a high quality factor and a wide spectral separation, as disclosed below.

Figure 4A:
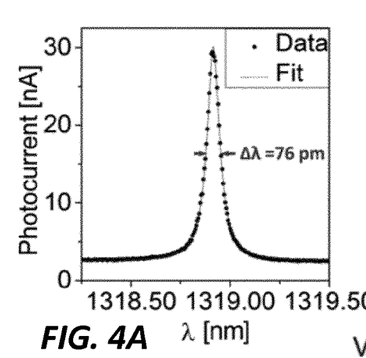
FIGS. 4A-4C show microspectrometer measurements (4A) a photocurrent spectrum of the fundamental symmetric mode of the three missing holes cavity (L3) modified for high quality (Q)-factor in double membrane, with a linewidth of 76 pm (Q~17000), where data was taken by measuring the photocurrent while a tuneable laser (P=125 µW) was swept across the cavity mode; (4B), photocurrent spectra (P=25 µW) showing the fundamental antisymmetric optical modes of an H0-cavity optimized spectrally tuning 30 nm (x-axis) for increasing reverse tuning bias VT from 0 to 5.6 V (y-axis), without reaching pull-in, where the tuning range is approximately equal to one free spectral range in this case: (4C), data traces of photocurrent collected by tuning the optical mode (second antisymmetric mode of the L3 cavity) over a single static laser line, at several different wavelengths displaced by 1 nm between two consecutive measurements, where the laser power was coupled into the cavity from top through a 0.45 NA objective, with the power incident on the sample being 12.5 µW, where the upper scale in the figure is obtained from a piecewise linear fit of the voltages at the maximum photocurrent versus wavelength. The cavity linewidth provides a spectral resolution of ~200 pm, and the FSR of ~13 nm is limited by the crossing with another cavity mode. The decrease in responsivity with decreasing inter-membrane distance (decreasing wavelength) is attributed to an asymmetry in membrane thickness, the upper membrane being 15 nm thicker.
Figure 4B:
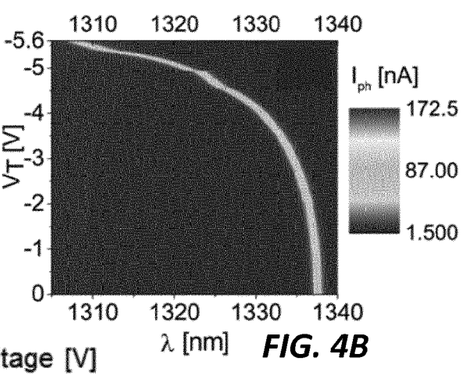

To demonstrate the resonant detection functionality, light from a tuneable laser (illuminating source) is coupled into the cavity from the top with a fixed bias on the actuation junction (FIG. 3A). The photocurrent spectrum corresponds to the cavity resonance, apart from a non-resonant background, and is a result of cavity-enhanced absorption. An experimental cavity linewidth for a symmetric fundamental photonic crystal mode as narrow as 76 pm (Q=$1.7 \times 10^4$) was obtained utilizing the optimized cavity design from FIG. 3D. This corresponds to an order of magnitude improvement over previous reports in resonant cavity detectors. The device maps the combination of the incident spectral power density S(ω) and intermembrane distance d into a photocurrent signal $$I_\varphi(d) = R \int_{-\infty}^{\infty} S(\omega) L_{cav}(d, \omega) d\omega,$$

where R is the responsivity (A/W) and $L_{cav}$(d, ω) the normalized spectral shape of the cavity resonance at frequency $\omega_0$(d). It can therefore be operated to sense either the spectrum of the incident radiation or the mechanical displacement by recording the photocurrent. In the spectrometer mode, the input spectral power density S(ω) is measured by actuating the membrane separation, d=d($V_T$), and for displacement sensing the membrane separation d can be deduced from the resonance frequency. As shown in FIG. 4B, tuning of an antisymmetric cavity mode by as much as 30 nm is obtained for a small applied voltage of 5.6 Volts, corresponding well to the simulated membrane tuning until the pull-in limit (⅓ of the original distance) inherent to capacitive tuning. The mode used in this case is the fundamental antisymmetric mode of a H0 cavity optimized for high free-spectral range (FSR), where FSR is defined as the maximum wavelength range for which there is only the mode of interest. Large tuning range in this case comes at a price of a larger linewidth of 0.7 nm ($Q_{exp}$=$1.9 \times 10^3$), a result of a trade-off between the two parameters. The spectrometer operation is demonstrated for a cavity mode where both Q and FSR are sufficiently high (FIG. 4C), which is the case for the second antisymmetric mode (Y2-As) of the modified L3 cavity, with a calculated Q=$1.2 \cdot 10^4$ and FSR=13 nm. For a number of fixed laser frequencies, a voltage sweep is made across the resonances. Peak positions were taken as calibration points, with which the wavelength scale (bottom) was converted to the voltage scale (top) in FIG. 4C.

Figure 4C:
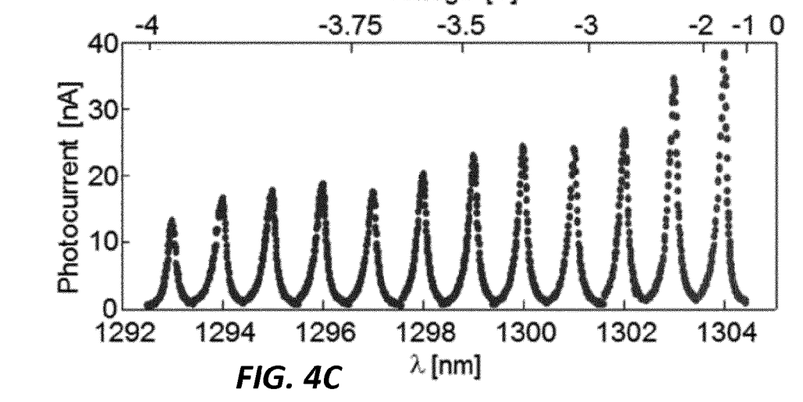
Figure 5A:
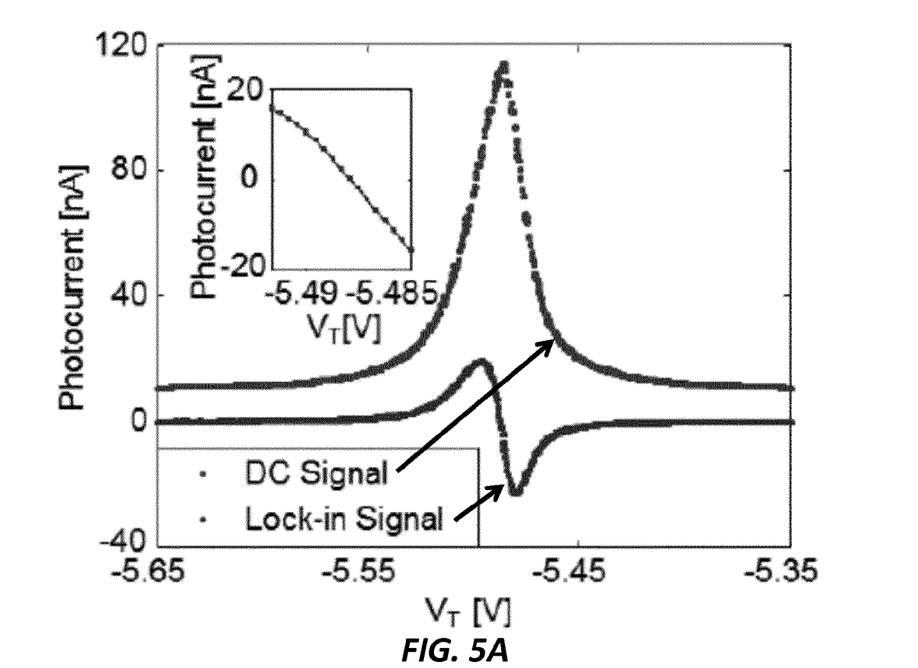
FIGS. 5A-5B show resonance modulation scheme and gas-sensing application (5A), comparison of a laser line recorded using two operation modes of the sensor: spectrometer mode described earlier (DC-Signal) and resonance modulation mode (Lock-in Signal). Measurements were performed simultaneously, by sweeping the tuning voltage and reading the photocurrent DC value, and the in-phase component measured by the lock-in amplifier, using a load resistor (30 kΩ). Since the Lock-in Signal curve is proportional to the derivative of the DC-Signal curve, the constant background is eliminated. On the tuning probe input, a modulated signal (VAC=5 mVpp, fm=608 Hz) is superimposed on a tuneable DC voltage VT using a resistive voltage adder. The cavity is excited at a fixed laser frequency of 1322 nm and the power incident on the sample is estimated to be 125 µW; Inset: Zoom-in of the zero crossing in the resonance modulation mode. (5B), Gas sensing demonstration, where an HF absorption line P(3) at 1312.591 nm is measured using resonance modulation scheme previously described. Voltage was translated into wavelength using a calibration curve obtained from independent PL cavity mode tuning data. A superluminescent diode (SLED) fiber-coupled to an HF gas cell (at p=50 Torr), and filtered with a 12 nm wide 1310 nm band pass filter is used for excitation. Filter is needed to isolate a single absorption line, and a single cavity mode; Inset: Optical Spectrum Analyzer (OSA) spectrum of the SLED with the HF cell inserted, showing the same absorption line.

The peak photodiode responsivity for the data in FIG. 4C is R~3×10$^{-3}$ A/W. It is limited by the small absorptance ($\eta_a$=0.05), which can be increased without a large influence on the Q, as well as unoptimized coupling efficiency ($\eta_c$=0.11), which can be improved using a side-coupling scheme. The cavity photocurrent peak shown in FIG. 4A is superimposed on a non-resonant background caused by light that is directly absorbed in the top membrane. The limited stray light rejection ratio (typically 10-20 dB) may be detrimental when a small spectral feature must be measured on a broad background. A resonance modulation spectroscopy scheme is provided, which can at the same time suppress the effect of background absorption and dramatically increase the spectral peak position resolution. It is based on the small size and built-in actuation functionality of our NOEMS, which enables modulating the mode resonant wavelength at frequencies up to the MHz range. Applying a small modulation to the tuning voltage as $V_T=V_{DC}+V_{AC}\cos(2\pi f_m t)$, the cavity frequency $\omega_{cav}$ is modulated around its central value $\omega_0(V_{DC})$ and the photocurrent $\delta I_\varphi^{f_m}$ at frequency $f_m$, as measured using a lock-in amplifier, becomes:

$$\delta I_\varphi^{f_m}(\omega_0(d_0)) = R\delta d \int_{-\infty}^{\infty} \frac{\partial L_{cav}(d,\omega)}{\partial d} S(\omega)d\omega = R\delta\omega_m \int_{-\infty}^{\infty} \frac{\partial L_{cav}(\omega_0,\omega)}{\partial \omega_0} S(\omega)d\omega, \quad (1)$$

where $\delta\omega_m=G_\omega\delta d$ is the frequency modulation depth (which we assume much smaller than the optical linewidth). Note that $L_{cav}$ is assumed to be a Lorentzian $L_{cav}(\omega-\omega_0)$ of constant width, so that $\partial L_{cav}/\partial\omega_0=-\partial L_{cav}/\partial\omega$. In the limit where $S(\omega)$ is much narrower than the cavity linewidth, $\delta I_\varphi^{f_m}(\omega_0)$ is proportional to the derivative of the cavity resonance lineshape. In the opposite limit of a slowly varying input spectrum, $\delta I_\varphi^{f_m}(\omega_0)$ is proportional to the derivative of the input spectrum $$\left.\frac{dS}{d\omega}\right|_{\omega_0}$$

as immediately follows from Eq. (1) from the integration by parts. The output signal therefore exclusively results from spectral features at the mode frequency and any spectrally flat background is rejected. The principle is demonstrated experimentally for a narrow laser line in FIG. 5A, also showing a large improvement of the rejection ratio, from 10 dB to 27 dB, with values up to 30 dB measured in other devices.

Figure 5B:
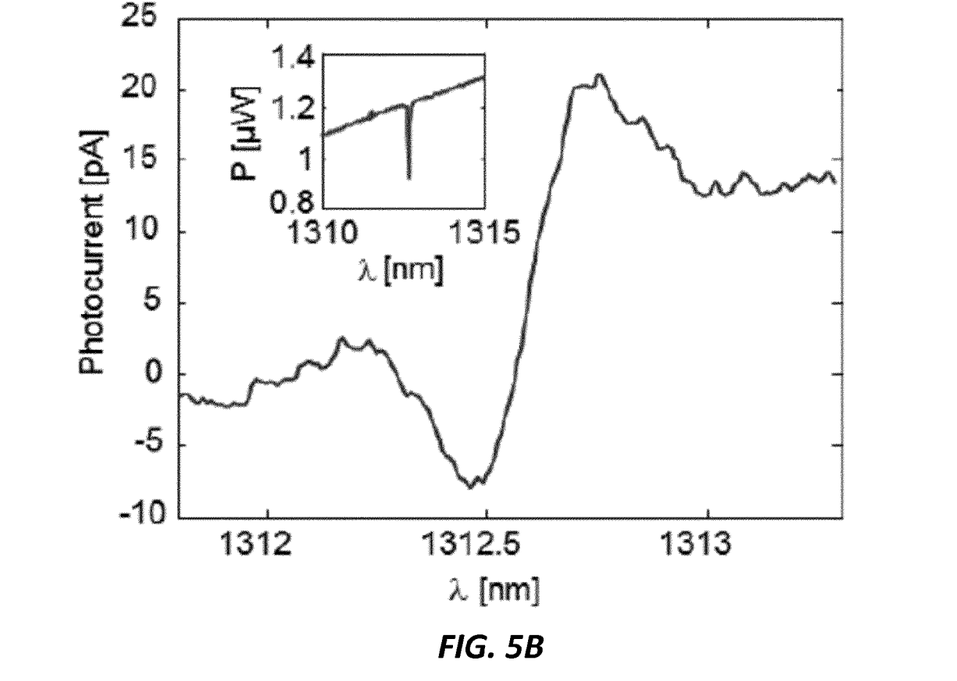

The sign-changing lineshape of the AC photocurrent amplitude also lends itself to the generation of an error signal for feedback-based stabilization. Similarly to frequency and wavelength modulation methods, the resonance modulation scheme allows for measuring the position of spectral lines with resolution much better than the linewidth. From the slope of the derivative curve at the zero crossing (inset FIG. 5A), the voltage-wavelength relation and the measured noise, a spectral resolution of 100 fm/Hz$^{1/2}$ is calculated, limited by the drift of the cavity resonance during the measurement time. This long-term drift, which produces resonant wavelength shifts in the picometer range over timescales of tens of seconds, is likely related to the adsorption of residual gases on the surface and in the holes of the PhC and temperature drifts. The intrinsic resolution, as limited by the electrical noise in the read-out, is estimated to be in the 10 fm/Hz$^{1/2}$ range. The background rejection provided by the resonance modulation scheme allows for measuring narrow absorption lines in a broad spectrum. This is demonstrated in FIG. 5B, where a hydrofluoric acid (HF) absorption line is detected, despite the fact that its linewidth (16 pm) is about 15 times narrower than the cavity linewidth used in this experiment (250 pm). The high peak position resolving power of our device would make it also useful for the read-out of temperature, index or pressure sensors that are based on spectral peak position determination.

In a further aspect, a microspectrometer is provided that is based on the aperiodic hole-patterns. These patterns, which could be the same or different in the two membranes, define a complex, multipeaked photocurrent spectrum with many sharp resonances which change with the membrane distance. A numerical reconstruction procedure is applied to get the original spectrum from the measured data, possibly using compressive sensing.

The first pattern of holes in the first membrane and the second pattern of holes in the second membrane are aperiodic and are configured to provide a photocurrent spectrum changing with wavelength on the scale of a small fraction of a wavelength (for example <1 nm), where the first pattern of holes is the same as second pattern of holes or the first pattern of holes is different from the second pattern of holes, where the applied voltage between the second electrode and the third electrode changes the photocurrent spectrum by moving the membrane on the scale of at least a fraction of a nanometer, where a sequence of measureable photocurrents for different applied voltages is output for reconstructing a spectrum of the illuminating source according to a numerical procedure operated by an appropriately programmed computer. Here, the numerical procedure includes an optimization method of finding the reconstructed spectrum that fits the sequence of measureable photocurrents with least error. In one implementation, the first hole-pattern and the second hole-pattern and the reconstructed spectrum are arranged according to an expected input spectrum determined through compressive sensing techniques. In one aspect the compressive sensing techniques include a numerical procedure that reconstructs the expected input spectrum, where the reconstructed input spectrum includes a size that is larger than a size of the sequence of photocurrents.

Input light, such as laser or LED light, experiences multiple scatterings in the aperiodic hole patterns. Mechanical tuning can trigger an optical path changing during the scatterings, which leads to the changing of transmittance. In another aspect, the optical path also depends on the wavelength of light. Therefore, the transmittance array obtained by scanning the mechanical tuning, is a unique "finger print" of the wavelength. In a further aspect, during calibration the wavelength is scanned of the band of interest, collecting all the transmittance arrays, which form a matrix T. Any input spectra S is then reconstructed by solving the problem I=TS, where I is a transmittance array obtained by scanning the mechanical tuning. This problem can be solved by the method of compressive sensing. Although one output waveguide and one detector are enough for reconstruction of the spectra, multiple waveguides and detectors can also be applied, in which case the number of measurement channels (the length of transmittance array) are multiplied, providing a better resolution and broader bandwidth. Furthermore, the device can also be composed of cascaded multiple regions of aperiodic hole-patterns, in which the mechanical tuning is independent for each region. In this case, the total number of measurement channels of device is $n^m$, where n is the number of measurement channels for single region, m is the number of regions. In another aspect of the invention, at least one absorbing region is patterned within a region of the first membrane or the second membrane or outside a region of the first membrane and the second membrane, where measureable photocurrents of the at least one absorbing region are output according to different applied voltages, where a spectrum of the illuminating source is reconstructed according to a numerical procedure operated by an appropriately programmed computer.

Some key aspects of the invention include broadband spectra reconstruction by mechanically tuning multiple scattering of light in aperiodically patterned media.

According to a further embodiment e invention, multiple output waveguides and detectors are implemented to increase measurement channels. In one example, a bandwidth of more than 100 nm is provided. In another embodiment, cascaded multiple independent tuning regions are implemented, which broaden the bandwidth further.

Figure 7A:
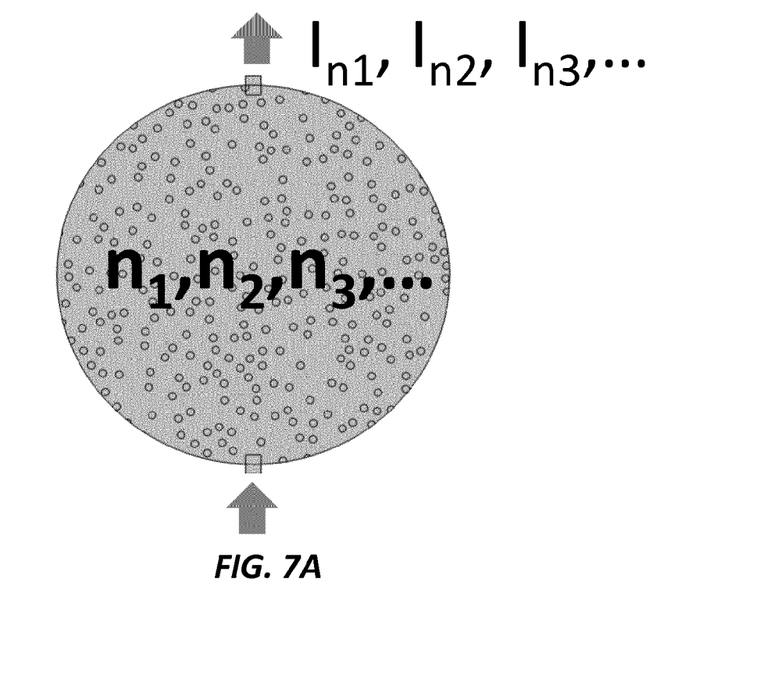
FIGS. 7A-7B show (7A) example aperiodic pattern of holes designed to provide strong spectral changes in the photocurrent; (7B) calculated photocurrent (in arbitrary units, assuming the efficiency of the detector is independent of wavelength) as a function of wavelength (x-axis) and of the index in the membrane, where in this case the change in index of a single membrane is used to mimic the change in distance between two membranes, according to one embodiment of the invention.
Figure 7B:
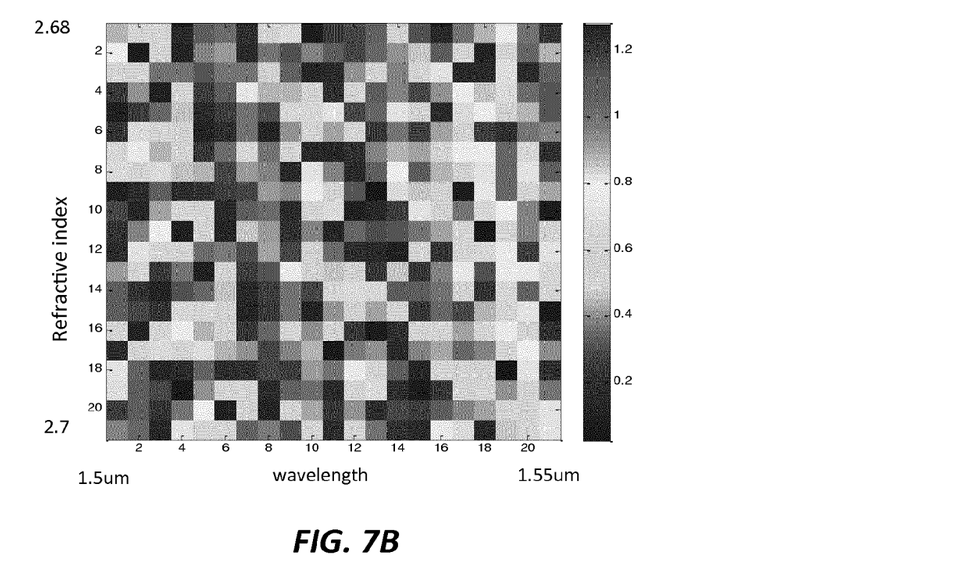

FIG. 7A) shows an example pattern of holes designed to provide strong spectral changes in the photocurrent. FIG. 7B shows the calculated photocurrent (in arbitrary units, assuming the efficiency of the detector is independent of wavelength) as a function of wavelength (x-axis) and of the index in the membrane, where in this case the change in index of a single membrane is used to mimic the change in distance between two membranes, according to one embodiment of the invention.

According to the invention, two implementations exist that include a "photonic crystal cavity" having a periodic pattern of holes except for a defect in the center (see FIG. 2), forming the cavity. In this example the same holes are patterned in both membranes. In another implementation an aperiodic pattern of holes, which may include a random pattern, may be different in the two membranes.

In another aspect of the invention, an array of double membrane microspectrometers is disposed, where an image is projected on the array with the use of a lens or equivalent optical system, where the microspectrometers are based either on a photonic crystal cavity or on aperiodic hole patterns, where the microspectrometers are actuated and read out in parallel or sequentially, where each microspectrometer of the array measures the light spectrum at a given position in the array, where the combination of all the spectra forms a hyperspectral image.

In a further aspect of the invention, a microspectrometer based on a photonic crystal cavity is illuminated with a spectrally-narrow source (for example a laser) with a wavelength close to the cavity resonance, where variations in the position of the first membrane produce a change in the photocurrent. The first electrode is connected to an amplifier and the second electrode is connected to a ground to form an integrated displacement detector, where the integrated displacement detector detects a displacement between the first membrane and the second membrane, where the applied voltage between the second electrode and the third electrode actuates a position of the first membrane. In one aspect, a combination of an actuator and a sensor is configured to output feedback stabilization of the position of the first membrane. In another aspect, a combination of an actuator and a sensor is configured to map a spatial profile of a surface under test.

Figure 8A:
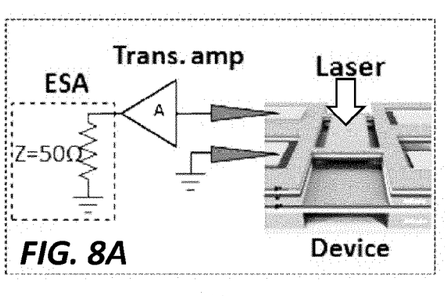
FIGS. 8A-8C show Brownian motion detected via photocurrent noise: (8A) shows a sketch of the measurement circuit, with indicated device, input laser, RF-probe, amplifier and the electronic spectrum analyzer (ESA). An RF probe is used to contact the on-chip photodiode, where the signal is sent via a transimpedance amplifier (A in the setup sketch) to the input of the ESA, where the device was mounted in a vacuum chamber (pressure below $10^{-4}$ mbar). In this experiment, no bias is supplied to the tuning diode; (8B) shows a photocurrent measurement of the cavity optical mode for the laser input power P=200 µW the arrow indicates the position of the laser in the ESA measurements ($\lambda$L=1314.29 nm). (8C), ESA spectrum of the photocurrent noise where the fundamental mechanical mode is visible in the output power (red dots) and control measurement with laser off (black dots), where the left axis shows the calibrated power spectral density of motion, and the CW laser was coupled into the cavity and the laser wavelength was red-detuned from resonance to the wavelength where the photocurrent varies maximally with detuning (see (8B)) and its power was kept low enough so as not to excite self-oscillations (Pest=200 µW), where the two other sharp features present in both measurements originate from the environmental RF noise; Inset: 3D color displacement plot of the 4-arm bridge fundamental mechanical mode with frequency f1=2.18 MHz simulated using Comsol.
Figure 8B:
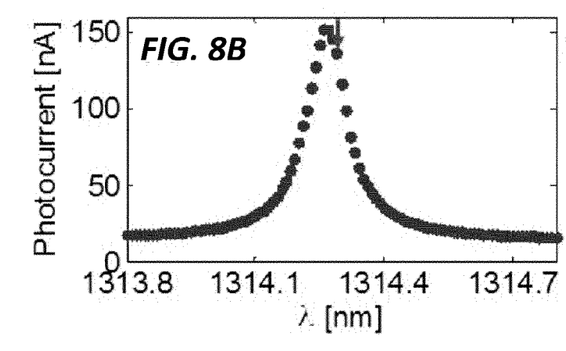
Figure 8C:
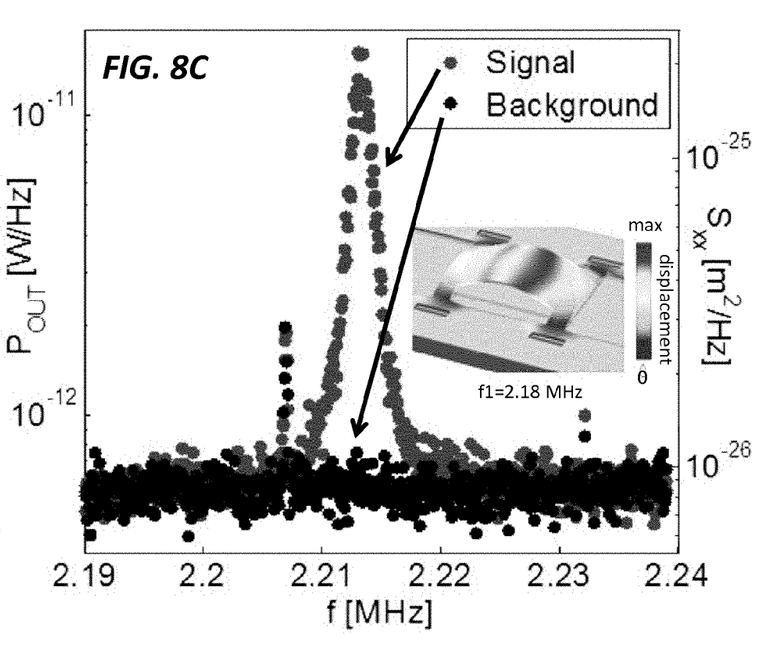

To demonstrate the motion sensor functionality, displacement fluctuations due to the Brownian thermal motion of the upper membrane were measured through the photocurrent, which directly monitors the intracavity field. A laser, detuned from a high-Q cavity mode FIG. 8B, is coupled into the cavity and the photocurrent spectrum is measured by an electronic spectrum analyzer (ESA), see FIG. 8A. Transduced thermal motion of the fundamental flexural mode with a frequency $\Omega_M/2\pi=2.2$ MHz and quality factor $Q_M\approx1400$ is observed, see FIG. 8C. By equating the observed resonant fluctuations to the thermal variance $<x_{th}^2>=k_BT/m_{eff}\Omega_M^2$, with T=297 K and $m_{eff}$=50 pg, obtained from FEM simulations (inset in FIG. 8C), the observed fluctuations can be converted to a displacement spectral density $S_{xx}$ (FIG. 8C right axis). The measurement imprecision is estimated to be 100 fm·Hz$^{-1/2}$. It is presently limited by un-optimized transduction and thermal noise in the read-out and could be improved to well below 1 fm·Hz$^{-1/2}$. Demonstrated herein is the possibility of actuating and sensing the membrane displacement at the fundamental mechanical resonance by measuring the electro-optomechanical transfer function using the integrated detector, as disclosed below. This suggests that the device can be used as a self-sensing actuator with position stabilization at the pm scale over MHz-range bandwidths.

An integrated nanophotonic sensor is disclosed that embodies the unique features of direct wavelength/displacement detection via photocurrent, and independent voltage control of the optical and mechanical properties of the structure via electrostatic actuation. Demonstrated herein is a high-resolution microspectrometer and proved displacement sensing capabilities on a single device based on coupled patterned membranes. Furthermore, a resonance modulation spectroscopy method is provided, exploiting the electromechanical control of the mode wavelength to reject stray light and increase the spectral resolution well beyond the cavity linewidth. Owing to the ultracompact size (15×15 µm$^2$) of the sensing element, this platform opens the way for mass production of multipurpose high-resolution sensors with embedded readout. The sensor can be easily applied to other material systems to cover different wavelength ranges (from the visible to the mid-infrared), and further developed for application in temperature, refractive index and electrical field sensing. In one example embodiment a III-V semiconductor platform is used for the device, which could be further exploited to integrate the light source, opening the way to fully-integrated optical and optomechanical sensors requiring no external optical connections.

Turning now to the methods of a sample structure. Here, a sample was epitaxially grown by Molecular Beam Epitaxy (MBE) and having two GaAs slabs with nominal thicknesses of 170 nm (bottom) and 185 nm (top), separated by a 240 nm thick sacrificial $Al_{0.7}Ga_{0.3}As$ layer. A 1.5 µm thick $Al_{0.7}Ga_{0.3}As$ bottom sacrificial layer separates the membranes from the undoped (001) GaAs substrate. QDs (areal density 70 QDs/mm$^2$, with ground-state absorption centered at 1310 nm at room temperature) are grown in the middle of the upper slab in a Stranski-Krastanov growth process. The upper 70 nm-thick part of both membranes was p-doped, while the bottom 70 nm-thick part of the bottom membrane was n-doped ($p_{upper}$=1.5×10$^{18}$ cm$^{-3}$, n=$p_{lower}$=2×10$^{18}$ cm$^{-3}$).

The fabrication process begins with defining the vias for the contact pads for the two diodes of the device in two optical lithography steps followed by selective wet and dry etching steps to reach the bottom p-via and the middle n-via. In the p-via lithography step, the flexible four-arm bridges are also defined, which determine the stiffness of the top membrane. To prevent the stress-induced buckling of the bridge, stress release structures were implemented FIG. 3D. No arms are etched in the lower membrane, making it mechanically much less compliant than the upper one. In the third optical lithography step, contact pads for all three contacts are defined and metals are evaporated. After a lift-off step, 400 nm of $Si_3N_4$ is deposited on the sample (hard mask), ZEP resist is spun and electron-beam lithography at 30 kV is performed to define the photonic crystal (PhC) pattern. After development, the PhC pattern is transferred onto the hard mask using RIE (reactive ion etching) with $CHF_3$. Resist is then removed with oxygen plasma, and the PhC pattern is imprinted as an array of holes in both membranes using an $Cl_2$-based inductively coupled plasma etching step. Release of the free-standing structure is done by selective wet etching of the sacrificial layer using a cold (1° C.) HCl solution. To prevent membrane stiction due to capillary forces; supercritical drying in $CO_2$ is employed. Finally, the hard mask is removed by isotropic $O_2$—$CF_4$ plasma dry etching.

In one example of a PhC cavity design, the light sensing double-membrane PhC cavity was designed to ensure small size (V~$\lambda^3$), high Q and sufficiently large free spectral range, by modifying standard L3 (with 3 holes missing in the hexagonal PhC) and H0 (holes displaced around a position in the lattice) designs, as shown in FIG. 2. In the chosen design of the L3 cavity used in the experiment in FIG. 4A, FIG. 4C, FIG. 5A-5B and FIG. 8A-8C the position and the radii of the closest six holes in the x-direction (displacements $s_1/a=0.3$, $s_2/a=0.225$, $s_3/a=0.1$; radii $r_1=r_2=r_3=0.6\cdot r$, with r/a=0.306 the radius of the holes in the PhC and a the lattice parameter), and the position of the four holes in the y-direction ($h_1/a=0.05$) were optimized, providing a simulated Q factor of $4\times10^4$ for a cavity without the absorber, and a mode spacing of $\Delta\lambda=24$ nm (from 3D Finite Element Method (FEM) simulations). In the case of the fundamental symmetric mode (Y1-S), the experimental result mentioned in the main text (FIG. 4A), provides the Q factor of $Q_{exp}=1.7\times10^4$, while the simulated value (with no absorber) gives a value $Q_{cold}=4.4\times10^4$. The absorption losses were estimated to give $Q_{abs}\approx1.2\times10^5$. The additional loss is attributed to scattering losses, patterning errors and other fabrication imperfections: $Q_{fabr}=(1/Q_{exp}-1/Q_{cold}-1/Q_{abs})^{-1}=3.6\times10^4$. In the case of the H0 cavity used for the experiment in FIG. 4B, by optimizing the position and radius of four holes, for a triangular lattice with r/a=0.33 and parameters $s_x=0.15$, $s_y=0.06$, and radii, $r_x/r=0.7$ and $r_y/r=0.75$, a simulated mode spacing of $\Delta\lambda=30$ nm and Q factor of $1.8\times10^4$ was obtained.

The peak responsivity is given by $R=(e/h\nu)\eta_c\eta_a\eta_i$ (e elementary charge, h Planck constant, ν light frequency, $\eta_c$ coupling efficiency of light into the cavity mode, $\eta_a$ fraction of cavity photons absorbed by the QDs, $\eta_i$ internal efficiency of converting absorbed photons into collected electrons and holes). The internal efficiency is estimated to be close to 1, no change of photocurrent was observed with applied reverse bias on the detector junction, indicating that carriers are efficiently extracted from the QDs. The current responsivity is limited by $\eta_a$ and $\eta_c$. The absorption can be increased further until the point when the absorption losses are comparable to the scattering losses, analogous to designs of Fabry Perot resonant cavity enhanced photodetectors. This would increase the sensitivity at the cost of decrease in the Q factor. This implies that the absorption and thus $\eta_a$ can be increased by increasing the QD density or the number of the QD layers. The free space coupling currently employed is expected to have a low efficiency $\eta_c$ due to the mismatch between the k-vector distribution of the incident field and the one of the cavity mode. It is known that coupling with on-chip waveguides can be much more efficient and lead to coupling efficiencies $\eta_c$ larger than 50%. Preliminary results of simulations show that similar coupling efficiencies can be expected when coupling waveguides to double-membrane cavities.

In the experimental setup, light from a tuneable laser (Santec TSL-510) was coupled into the cavity from the top through a 50× objective (NA=0.45). All laser powers indicated in the main text are values incident on the sample. The two diodes were contacted using two adjustable RF probes. In FIGS. 4A-4C and FIGS. 5A-5B, the photocurrent was measured as a voltage drop on a 30 kΩ load resistor (R in FIG. 4A). For the measurements in FIGS. 8A-8C, photocurrent was amplified using a transimpedance amplifier ($A=5\times10^5$ V/A). All measurements were performed at room temperature. The thermal noise measurements in FIGS. 8B-8C were performed under vacuum conditions ($p<10^{-4}$ mbar) to suppress viscous air damping.

The wavelength resolution in FIG. 5A is determined by measuring the current noise in the readout when laser is on resonance with the cavity, $\delta I_{noise}=50$ pA·Hz$^{-1/2}$ (measured using the lock-in-amplifier) and the slope of the derivative curve at the zero crossing $S_1=5$ μA/V, from which the voltage accuracy is calculated to be $\delta V_T=dI_{noise}/S_1=10$ μV·Hz$^{-1/2}$. With the mode wavelength tuning rate being 10 nm/V, this voltage accuracy can be translated into a (peak position) resolution of 100 fm when measured in 1 Hz bandwidth, a value three orders of magnitude smaller than the linewidth. As previously mentioned, this value is limited by the long-term drift of the cavity resonance. The fundamental noise limit, in the case where no drift is present, would be determined by the thermal noise of the load resistor (~1.7 pA·Hz$^{-1/2}$ and photon shot noise (~10 fA·Hz$^{-1/2}$), both being orders of magnitude lower.

Figure 9A:
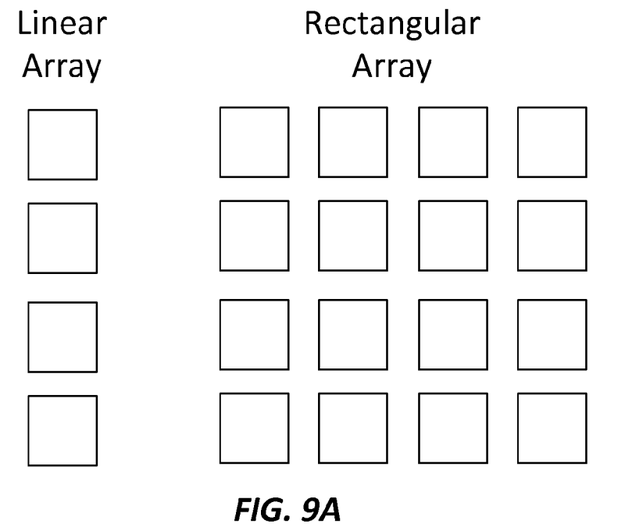
FIGS. 9A-9B show an array of the double membrane microspectrometers disposed in a linear or rectangular pattern (9A), and an image is projected a rectangular array of double membranes through an optical system (9B), according to one embodiment of the invention.
Figure 9B:
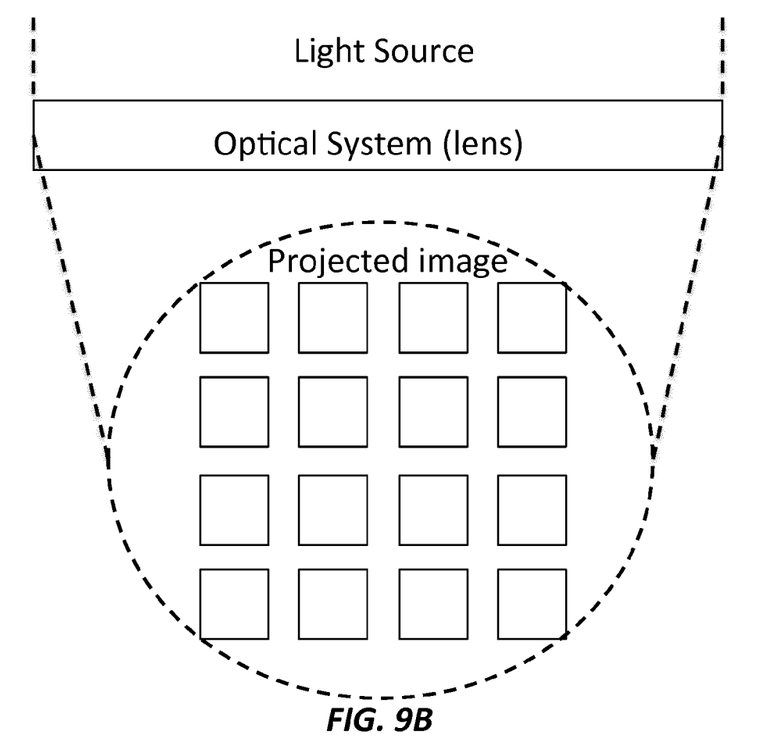

FIGS. 9A-9B show an array of the double membrane microspectrometers disposed in a linear or rectangular pattern (see FIG. 9A), where the hole patterns in the double membranes are the same or different, where the array of double membrane microspectrometers are actuated separately or together. As shown in FIG. 9B an image is projected on a rectangular array of double membranes through an optical system, such as a lens, where each microspectrometer measures a light spectrum at a given position, and a combination of all the light spectra forms a hyperspectral image.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, the membranes could be made of different materials, including semiconductors, dielectrics or metals, the optically absorbing material could be different or positioned differently, for example above or below the membranes or within the second membrane or on the side of the membranes, the actuation of the first or the second membrane could be realized through a metal capacitor or by piezoelectric or inductive forces, or only parts of the first or the second membrane could be actuated.

All such variations are considered to be within the scope and spirit of the present invention as defined by the following claims and their legal equivalents.

What is claimed:

1. A double membrane microspectrometer, comprising:
   a) a first membrane comprising a first doped semiconductor layer, a first intrinsic semiconductor layer, and a second doped semiconductor layer, wherein said first doped semiconductor layer is opposite said second doped semiconductor layer, wherein said first intrinsic semiconductor layer is disposed between said first doped semiconductor layer and said second doped semiconductor layer, wherein said first intrinsic semiconductor layer comprises an optically absorbing material disposed therein, wherein said first membrane comprises a first pattern of through holes disposed perpendicular to said first membrane semiconductor layers, wherein said first membrane comprises lateral support arms disposed to support said first membrane;
   b) a second membrane comprising a third doped semiconductor layer and a fourth semiconductor layer, wherein said third doped semiconductor layer is opposite said fourth semiconductor layer, wherein said fourth semiconductor layer comprises an intrinsic semiconductor layer or a doped semiconductor layer, wherein said second membrane comprises a second pattern of through holes disposed perpendicular to said second membrane semiconductor layers, wherein said first membrane is separated from said second membrane by a first insulating bridge layer disposed proximal to the ends of said lateral support arms, wherein said first optical membrane is supported above said second membrane by said lateral support arms, wherein an absorption spectrum of said optically absorbing material is dependent on a separation distance of said first membrane from said second membrane;
   c) a first electrode disposed on said first semiconductor layer;
   d) a second electrode disposed on said second semiconductor layer; and
   e) a third electrode disposed on said third semiconductor layer, wherein an illuminating source directed across said first pattern of holes is absorbed in said optical absorbing material in said first intrinsic semiconductor layer, wherein a photocurrent is output between said first electrode and said second electrode for detection, wherein a voltage applied across said second electrode and said third electrode is disposed to move said first membrane to alter a photocurrent between said first electrode and said second electrode, wherein said photocurrent alteration corresponds to the optical spectrum of said illuminating source.

2. The double membrane microspectrometer of claim 1, wherein said first electrode is connected to an amplifier and said second electrode is connected to a ground to form an integrated photocurrent detector, wherein said integrated photocurrent detector detects said photocurrent across said first intrinsic semiconductor layer according to said illuminating source directed on said pattern of holes.

3. The double membrane microspectrometer of claim 2, wherein said first pattern of holes and said second pattern of holes are configured to produce a resonance in a photocurrent, wherein said applied voltage alters a spectral position of said resonance, wherein a photocurrent dependence on said applied voltage outputs a measurement of a spectrum of said illuminating source.

4. The double membrane microspectrometer of claim 3, wherein said applied voltage comprises a frequency modulated applied volt, wherein said photocurrent from said integrated photocurrent detector is output at said frequency.

5. The double membrane microspectrometer of claim 2, wherein said first pattern of holes in said first membrane and said second pattern of holes in said second membrane are configured to provide a photocurrent spectrum changing with wavelength on the scale of a fraction of said wavelength, wherein said applied voltage between said second electrode and said third electrode changes said photocurrent spectrum by moving the membrane on the scale of at least a fraction of a nanometer, wherein a sequence of measureable photocurrents for different applied voltages is output for reconstructing a spectrum of said illuminating source according to a numerical procedure operated by an appropriately programmed computer.

6. The double membrane microspectrometer of claim 5, wherein said numerical procedure comprises an optimization method of finding said reconstructed spectrum that fits said sequence of measureable photocurrents with least error.

7. The double membrane microspectrometer of claim 5, wherein said first pattern of through holes is the same as second pattern of through holes or said first pattern of through holes is different from said second pattern of through holes.

8. The double membrane microspectrometer of claim 5, wherein said first hole-pattern and said second hole-pattern and said reconstructed spectrum are arranged according to an expected input spectrum according to compressive sensing techniques.

9. The double membrane microspectrometer of claim 8, wherein said compressive sensing techniques comprise a numerical procedure that reconstructs said expected input spectrum, wherein said reconstructed input spectrum comprises a size that is larger than a size of said sequence of photocurrents.

10. The double membrane microspectrometer of claim 2, wherein at least one absorbing region is patterned within a region of said first membrane or said second membrane or outside a region of said first membrane and said second membrane, wherein measureable photocurrents of said at least one absorbing region are output according to different applied voltages, wherein a spectrum of said illuminating source is reconstructed according to a numerical procedure operated by an appropriately programmed computer.

11. The double membrane microspectrometer of claim 10, wherein said first hole-pattern and said reconstructed spectrum are arranged according to an expected input spectrum according to compressive sensing techniques.

12. The double membrane microspectrometer of claim 1, wherein said first electrode is connected to an amplifier and said second electrode is connected to a ground to form an integrated displacement detector, wherein said integrated displacement detector detects a displacement between said first membrane and said second membrane, wherein said applied voltage between said second electrode and said third electrode actuates a position of the first membrane.

13. The double membrane microspectrometer of claim 12, wherein a combination of an actuator and a sensor is configured to output feedback stabilization of said position of said first membrane.

14. The double membrane microspectrometer of claim 12, wherein a combination of an actuator and a sensor is configured to map a spatial profile of a surface under test.

15. The double membrane microspectrometer of claim 1, wherein said hole-pattern in said first membrane and said hole-pattern in said second membrane are the same, wherein said first membrane and said second membrane are evanescently coupled, wherein said hole-patterns in said first and said second membrane form a photonic crystal cavity.

16. The double membrane microspectrometer of claim 15, wherein said photonic crystal cavity is a modified L3 or H0 cavity.

17. The double membrane microspectrometer of claim 1, wherein said first semiconductor layer comprises a p-type semiconductor layer and said second semiconductor layer comprises an n-type semiconductor layer, or said first semiconductor layer comprises an n-type semiconductor layer and said second semiconductor layer comprises a p-type semiconductor layer.

18. The double membrane microspectrometer of claim 1, wherein said third semiconductor layer comprises a p-type semiconductor layer and said fourth semiconductor layer comprises an n-type semiconductor layer, or said third semiconductor layer comprises an n-type semiconductor layer and said fourth semiconductor layer comprises a p-type semiconductor layer, or said fourth semiconductor layer comprises an intrinsic semiconductor layer.

19. The double membrane microspectrometer of claim 1, wherein a lower part of said first membrane and an upper part of said second membrane are doped to form p-i-n diode.

20. The double membrane microspectrometer of claim 1, wherein said optical absorbing material is selected from the group consisting of quantum wells, quantum dots and bulk material.

21. The double membrane microspectrometer of claim 1, wherein said first membrane, said second membrane and said illuminating source are integrated on a chip, wherein said illuminating source is selected from the group consisting of a laser and a light-emitting-diode.

22. The double membrane microspectrometer of claim 1, wherein said double membrane microspectrometer comprises an array of said double membrane microspectrometers, wherein said array of double membrane microspectrometers are disposed in a linear or rectangular pattern, wherein said hole patterns in said double membranes are the same or different, wherein said array of double membrane microspectrometers are actuated separately or together, wherein an image is projected on said array of double membranes through an optical system, wherein each said microspectrometer measures a light spectrum at a given position, wherein a set of spectra of all said light spectra forms a hyperspectral image.

* * * * *